United States Patent [19]

O'Neill

[11] 4,020,527

[45] May 3, 1977

[54] GRIP FOR A HAND HELD PORTABLE DEVICE

[76] Inventor: Wilbur J. O'Neill, 319 Hollyberry Road, W. Severna Park, Md. 21146

[22] Filed: Jan. 2, 1976

[21] Appl. No.: 646,032

[52] U.S. Cl. .............................. 16/110 R; 235/1 D; 401/8; 16/119
[51] Int. Cl.$^2$ ......................................... G06C 5/00
[58] Field of Search ................. 16/110 R, 125, 119; 15/227; 401/8, 7; 34/95.2; 235/1 D; 84/453, 376, 379; 294/25

[56] References Cited

UNITED STATES PATENTS

| 509,156 | 11/1893 | Fry | 401/8 |
|---|---|---|---|
| 1,021,350 | 3/1912 | Bush | 401/8 X |
| 1,667,067 | 4/1928 | Chesley | 15/227 UX |
| 3,265,297 | 8/1966 | Behrens | 235/1 D |
| 3,488,126 | 1/1970 | Avallone | 401/8 |
| 3,887,791 | 6/1975 | Kitchens | 235/1 D |

OTHER PUBLICATIONS

Printed Publication, "Accordians by Hohner." Popular Mechanics, Jan. 1957, p. 205.

*Primary Examiner*—Andrew V. Kundrat

[57] ABSTRACT

A hand held electronic calculator which includes a grip for attaching the calculator to the hand of the user to make it fully operable with one hand while reducing the danger of damage by dropping. The concept is equally applicable to any hand held device having a keyboard, such as various telephone handsets and to remote control devices wherein the keyboard consists of one or more switches.

7 Claims, 10 Drawing Figures

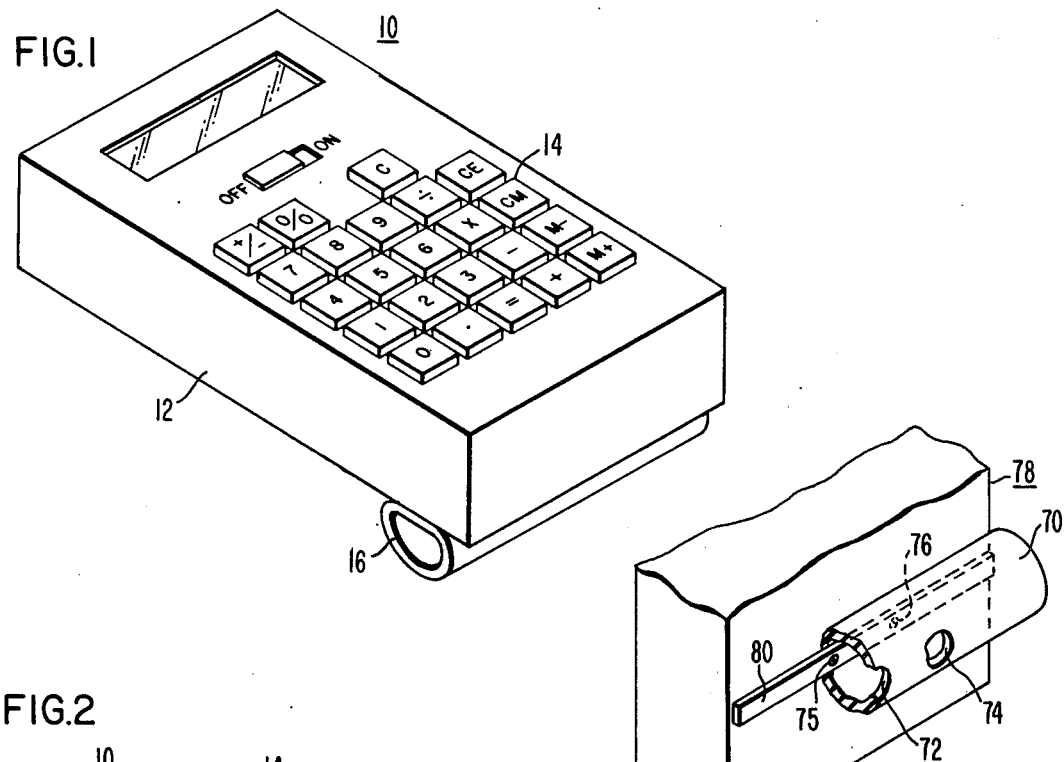
FIG.1
FIG.2
FIG.10
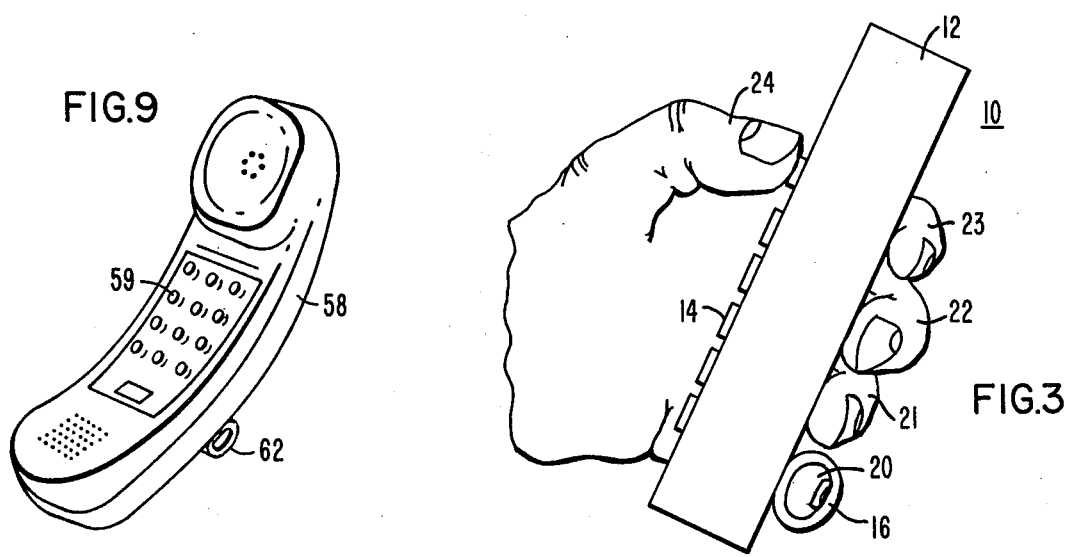
FIG.9
FIG.3

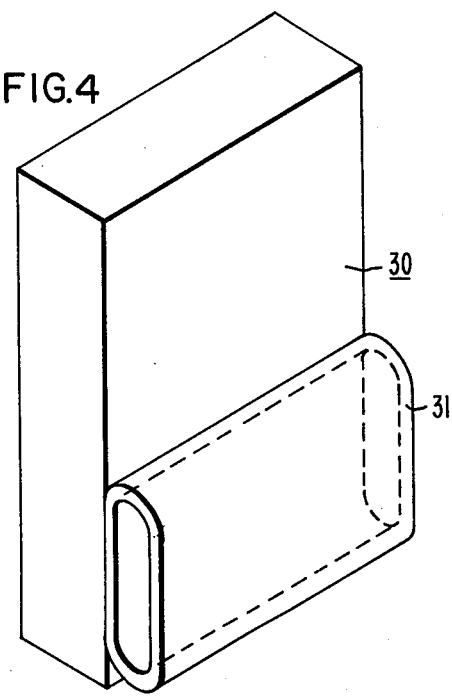
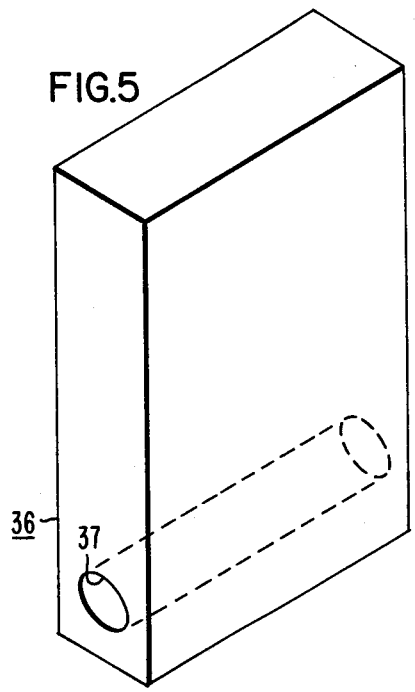
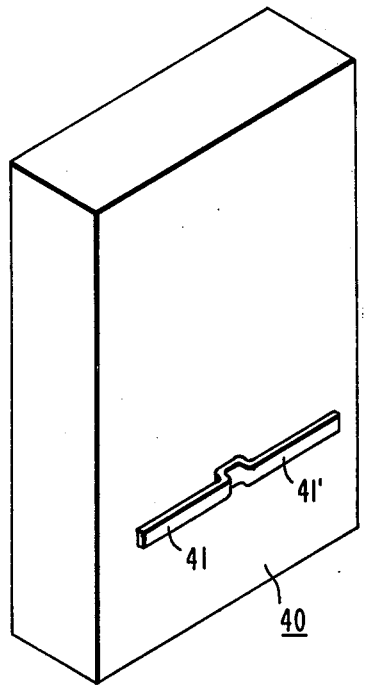
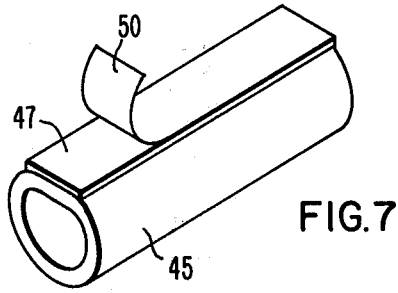
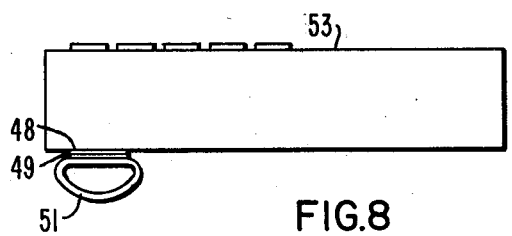

GRIP FOR A HAND HELD PORTABLE DEVICE

BACKGROUND OF THE INVENTION

1. Field of the Invention

The invention, in general, relates to portable keyboard devices and/or grips therefor.

2. Description of the Prior Art

Portable electronic calculators are presently designed to be used on desk top or held with one hand while the keyboard is activated with the other.

It is sometimes desirable to be able to make notes or otherwise occupy the user's one hand while holding the calculator in the other hand, however, such use requires the calculator to be placed on a surface and the pencil must be released to enable the favored hand to punch the keys. Very often when used on a surface the line of sight for reading the calculator is not optimum.

SUMMARY OF THE INVENTION

The present invention allows one-handed (either one) operation of the calculator, in addition to other hand held portable devices, by provision of finger receiving means in cooperation with the body member of the calculator, with the finger receiving means being positioned such that the user may insert at least one finger and activate the keys of the calculator with another finger (such as the thumb) of the same hand.

The less often used hand can be sufficient to both hold (or be held by) and operate the calculator, or other device. This leaves the more often used hand available for functions such as writing, following a column or other desirable concurrent operation.

BRIEF DESCRIPTION OF THE DRAWINGS

FIG. 1 is a pictorial view of the invention in conjunction with an electronic calculator;

FIG. 2 is a side view of the apparatus of FIG. 1;

FIG. 3 illustrates the apparatus of FIG. 1 in use;

FIGS. 4, 5 and 6 illustrate various other embodiments of the present invention;

FIG. 7 illustrates a finger receiving means for attachment to a calculator or the like;

FIG. 8 illustrates a device similar to that of FIG. 7 in cooperation with a calculator;

FIG. 9 is a view of the apparatus in conjunction with a telephone handset; and

FIG. 10 is a view of an alternate attachment scheme.

DESCRIPTION OF THE PREFERRED EMBODIMENTS

Referring now to FIG. 1, there is illustrated a hand held portable electronic calculator 10 having a body member 12 and a keyboard 14. A finger receiving device 16 is in operative cooperation with the body member 12 at the lower back portion thereof, by way of example.

The finger receiving device 16 is generally cylindrical and in a preferred embodiment is flexible and collapsible as illustrated in FIG. 2, to facilitate storage. Depending upon the material or composition of device 16, it may be positioned relative to the calculator body so that when collapsed for storage a small tab portion 17 is accessible for flipping to an open position.

The finger receiving device 16 may be manufactured as a flexible tube and in use, as illustrated in FIG. 3, the little finger 20 of the user may be inserted snugly in the tube 16 while the ring, middle, and index fingers 21, 22 and 23 support the rear of the body member 12. Activation of the keyboard is then accomplished by the thumb 24 of the same hand.

FIG. 4 shows a calculator body 30 with a finger receiving means 31 on the back thereof similar to finger receiving means 16 however of a larger size to accommodate more than one finger.

FIG. 5 illustrates an arrangement wherein the body member 36 is a molded unit and the finger receiving means 37 is an integral part of the molded unit and constitutes a finger receiving aperture extending into, or through the body member.

In FIG. 6, the body member 40 has on the back thereof projections 41 and 41' which the user may slip under a ring worn on the finger to accomplish the same one-handed operation.

The finger receiving means of a size to accommodate at least one finger of the user may also be fabricated as a separate item for attachment to a previously acquired calculator. For example, FIG. 7 illustrates a finger receiving means in the form of a flexible tube 45 having an attachment means 47, which in one embodiment will allow for relatively permanent attachment to the calculator. One such example may be an adhesive in which instance a peel-off covering member 50 would be provided. Other configurations such as complementary hook and loop fasteners (commonly known as Velcro fasteners) are also suggested, in which case, as illustrated in FIG. 8 the hook or loop portion 48 could be adhesively affixed to the calculator body 43 while the complementary portion 49 forms or is connected to tube 51 for selective detachment.

Although an embodiment of the invention described is with respect to a hand held portable electronic calculator, the invention is equally applicable in other various types of hand held keyboard or switching devices one of which is a telephone headset illustrated in FIG. 9.

The telephone headset 58 has a keyboard 59 and a finger receiving means 62 of the type described, is in operative cooperation with the side opposite the keyboard 59 to allow the user to pick up the headset and complete a call with just one hand.

The finger engaging device described herein may be fabricated of a size to fit an "average" little finger for use as in FIG. 3. Its resiliency will allow for a wide margin. As a "stick on" however as in FIG. 7, the device may be fabricated in a variety of sizes to accommodate a variety of different finger sizes.

As another alternative and as illustrated in FIG. 10 a tube 70 is provided with two apertures 72 and 74 for insertion of a screwdriver for fastening screws 75 and 76 to the calculator body 78 through plate 80. Different size tubes 70 may then be provided with the sale of the calculator, and the proper size tube may be affixed by the user or users.

Although the invention has been described with a certain degree of particularly, it should be understood that the present disclosure has been made by way of example and that modifications and variation of the present invention are made possible in the light of above teachings. In this regard the term keyboard used herein is meant to include not only the well known keys of a calculator but also the buttons, switches or the like of other hand held devices.

I claim:

1. In a hand held portable electronic calculator, the improvement comprising:

a. a calculator body member;

b. a hollow finger receiving means oriented relative to the keys of the calculator selectively activate any one of the keys of said calculator with the thumb of the same hand while the remaining fingers of the same hand support the rear of said calculator body.

2. Apparatus according to claim 1 wherein:

A. said finger receiving means is cylindrical.

3. Apparatus according to claim 2 wherein:

A. said finger receiving means is flexible and collapsible.

4. Apparatus according to claim 2 wherein:

A. said finger receiving means is tubular.

5. Apparatus according to claim 2 wherein:

A. said body member is a molded unit; and

B. said finger receiving means is an integral part of said molded unit.

6. A grip for a hand held portable device having a body member and a keyboard on one side, comprising:

A. a tubular elongated finger receiving means sized to fit the width of said body on the side thereof opposite the side having said keyboard and being of sufficient length and diameter so as to accommodate at least a finger of the user of said device without interfering with the use of such device;

B. attachment means for securing said finger receiving means to said opposite side of said body member at a position whereby the user may insert at least one finger in said receiving means and activate the keys of said device with the thumb of the same hand;

C. said attachment means including an adhesive disposed along a portion of said elongated finger receiving means; and D. a protective peel off covering member covering said adhesive.

7. In a hand held device having a front keyboard and a rear body portion, the improvement comprising:

A. a hollow finger receiving means on said device and oriented relative to the keyboard such that the user may insert at least one finger in said finger receiving means and selectively activate the keys of said keyboard with the thumb of the same hand while the remaining fingers of the same hand support said rear body portion.

* * * * *